Feb. 18, 1936.  C. G. KING  2,031,110
MULTIPLE RING BRACELET
Filed March 6, 1933  2 Sheets-Sheet 1
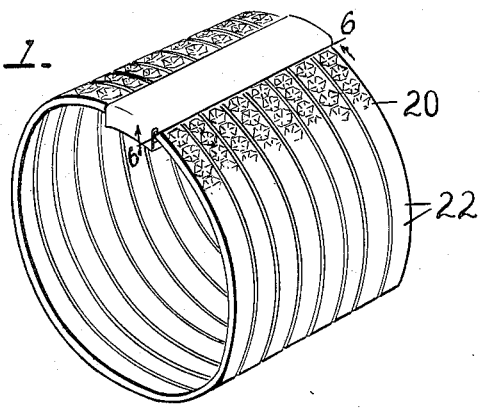
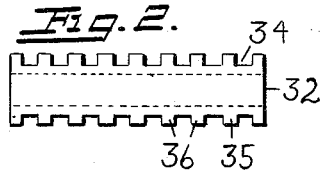
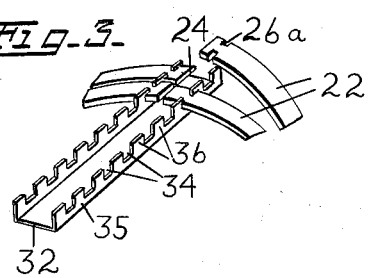
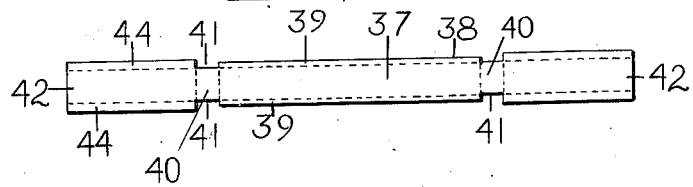
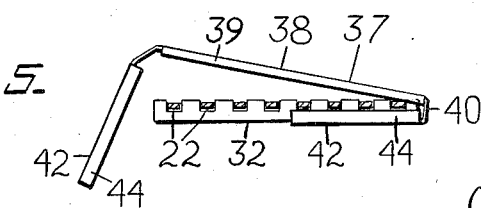
Clifford G. King
INVENTOR.
BY Thomas A. Jenkins
ATTORNEY.

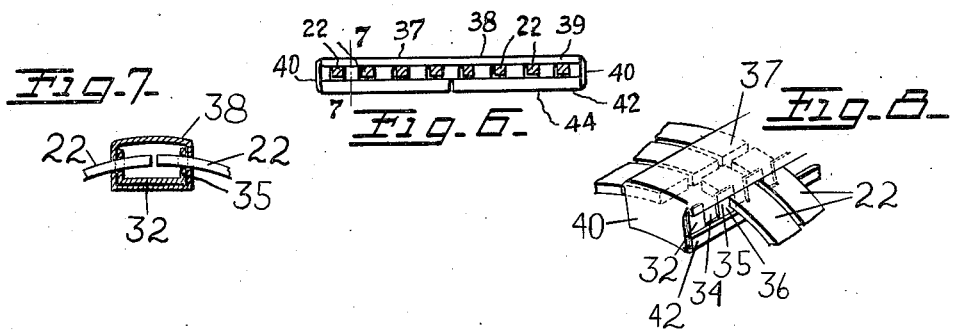

Patented Feb. 18, 1936

2,031,110

UNITED STATES PATENT OFFICE 2,031,110

MULTIPLE RING BRACELET

Clifford G. King, Barrington, R. I.

Application March 6, 1933, Serial No. 659,785

10 Claims. (Cl. 63—3)

My invention relates to improvements in multiple ring bracelets and the method of their manufacture.

One feature of my invention relates to the provision of a multiple ring bracelet composed of split rings having the ends thereof shaped to form clasp means attaching means and a novel type of clasp means adapted to cooperate with said clasp means attaching means in the ends of said separate split rings to secure said rings to said clasp means in side by side relationship and against rotative movement thereon.

While I am aware that others have provided continuous multiple ring bracelets, so far as I am aware I am the first to provide split multiple rings and means to attach the split multiple rings to a clasp means to secure said individual rings against rotative movement thereon, thereby providing a multiple ring bracelet in which the rings thereof will stay evenly in relation to the clasp means and not get out of shape as has often happened in former types of multiple ring bracelets where the rings are not directly secured to the clasp means against rotative movement thereon. This feature of my invention specifically relates to the specific construction of various types of end constructions for the separate split rings and specific types of cooperating clasp means to secure the ends of the split rings thereto against rotative movement thereon.

My invention therefore relates to the provision of any type of means broadly and to the specific construction of the various types of means shown for this purpose.

While others have made multiple ring bracelets I also believe that I am the first to provide split ornamental ring bracelets of this description, preferably having ornamented outer surfaces so that individual split rings may be readily attached to the clasp means and due to the fact that I preferably employ split rings I am enabled to make large economies in their method of manufacture.

While I am aware that others have attempted to ornament the outer surface of strip material in any suitable fashion, they have usually attempted to solder the rings together or to the clasp means. By providing the type of clasp means I preferably employ I am enabled to affect great economies in the method of manufacture. I also believe that I am enabled to make large economies in the manufacture of the split rings themselves according to the novel method about to be described. After the outer surface of the strip material is ornamented in any suitable fashion I preferably wind the strip material in helical form on a cylindrical mandrel and by sawing the rings along a line parallel to the axis of said mandrel I am enabled to provide a plurality of split rings having the outer ornamented surfaces. Then to form suitable means on said split ring members to form cooperating attaching means near each end thereof, I either bend, form or cut holes in the respective ends of the ring members in any suitable manner, such as in the various manners shown.

There have lately come into the market ornamented rings having the outer surfaces thereof duly ornamented by having diamond indented holes in the outer surfaces thereof formed by successively punching them with a diamond. The diamond itself seems to leave its sheen in the punched holes so that the holes will glisten in simulation of a diamond and it is to the manufacture of this type of ornamented multiple ring bracelet that both my improved clasp means and improved split rings are particularly adapted.

These and such other objects of my invention as may hereinafter appear will be best understood from a description of an embodiment thereof, and method of manufacture illustrated in the accompanying drawings.

In the drawings, Fig. 1 is a perspective view of my preferred embodiment of bracelet showing individual diamond punched split rings and the improved type of clasp means I preferably employ for joining them together in side by side relationship.

Fig. 2 is a plan view of the blank from which the lower clasp member may be readily fabricated.

Fig. 3 is a perspective view of the blank shown in Fig. 2 after the side walls have been bent up to align the slits therein to form prongs between the slits adapted to register in adjacent slits of adjacent ring members formed as in Fig. 4 to string the opposite ends of said ring members therein in side by side relationship, two of the individual split ring members being shown in the act of being strung thereon.

Fig. 4 is a plan view of the blank I preferably employ for making the upper clasp member.

Fig. 5 is a side elevation showing how the blank in Fig. 4 may be folded around the lower clasp member to form with the lower clasp member the clasp means I preferably employ.

Fig. 6 is a sectional view taken along the clasp means along the line 6—6 of Fig. 1.

Fig. 7 is a sectional view taken through the clasp means along the line 7—7 of Fig. 6.

Fig. 8 is an enlarged perspective view showing an end of the clasp means with rings attached and after the upper clasp member has been bent over the lower clasp member to substantially encompass it as illustrated in Fig. 5.

Figs. 9–24 illustrate different types of clasp means I may employ for this purpose, also illustrating how the clasp attaching means employed may be varied, illustrating cross sectional views and transverse sectional views of the different embodiments thereof and perspective end views of the respective ring members, Fig. 21 also being a perspective view of an end of the specific type of lower clasp means I employ in the embodiment shown in Figs. 18–21 and Fig. 24 instead of showing a transverse sectional view showing a diagrammatic end perspective view of how the ring members are attached to the clasp means in this type of embodiment shown in Figs. 22–24 and in which Fig. 9 indicates a sectional view taken through the clasp means similar to Fig. 7 of a supplemental embodiment of my invention.

Fig. 10 is a perspective view of an end of a ring member employed in the embodiment shown in Fig. 9.

Fig. 11 is a sectional view taken along the clasp means similar to Fig. 6 of the embodiment of my invention shown in Figs. 9 and 10.

Fig. 12 indicates a sectional view taken through the clasp means similar to Fig. 7 of a supplemental embodiment of my invention.

Fig. 13 is a perspective view of an end of a ring member employed in the embodiment shown in Fig. 12.

Fig. 14 is a sectional view taken along the clasp means similar to Fig. 6 of the embodiment of my invention shown in Figs. 12 and 13.

Fig. 15 indicates a sectional view taken through the clasp means similar to Fig. 7 of a supplemental embodiment of my invention.

Fig. 16 is a perspective view of an end of a ring member employed in the embodiment shown in Fig. 15.

Fig. 17 is a sectional view taken along the clasp means similar to Fig. 6 of the embodiment of my invention shown in Figs. 15 and 16.

Fig. 18 indicates a sectional view taken through the clasp means similar to Fig. 7 of a supplemental embodiment of my invention.

Fig. 19 is a perspective view of an end of a ring member employed in the embodiment shown in Fig. 18.

Fig. 20 is a sectional view taken along the clasp means similar to Fig. 6 of the embodiment of my invention shown in Figs. 17 and 18.

Fig. 21 is a perspective view of one end of the specific type of lower clasp means I employ in the embodiment shown in Figs. 18–20.

Fig. 22 indicates a sectional view taken through the clasp means similar to Fig. 7 of a supplemental embodiment of my invention.

Fig. 23 is a perspective view of an end of a ring member employed in the embodiment shown in Fig. 22.

Fig. 24 is a diagrammatic end perspective view illustrating how the ring members are attached to the clasp means in this type of embodiment shown in Figs. 22 and 23.

In the drawings, wherein like characters of reference indicate like parts throughout, 20 generally indicates a multiple ring bracelet constructed in accordance with my invention. This bracelet 20 includes a plurality of split ring members 22 individually split as at 24 and having the ends thereof shaped as at 26 to form cooperating clasp attaching means. In the preferred embodiment of my invention shown, said ornamentation preferably consists of a type of diamond indented holes on the outer surface thereof which has recently come on the market. To cooperate with said rings, I provide a clasp means preferably adapted to extend transversely at least partially around said ring members to cooperate with said clasp attaching means to hold said ring members in side by side relationship and against rotative movement thereon. By providing the individual ring members 22 of individual split construction it is obvious that I effect the economies in the manufacture later to be described. While the ends of said rings adjacent said split may be shaped to form cooperating attaching means in any suitable manner, in the preferred embodiment shown in Figs. 1–8 I preferably provide sets of transverse slits 26$^a$ on the outer edges thereof near each end thereof. As shown in Figs. 9–11 however, I may form said clasp attaching means by bending the ends thereof downwards as at 26$^b$, or may as shown in Figs. 15–17 form the ends of said ring members with the lateral projections 26$^c$, or may as shown in Figs. 18–21 and 22–24 merely provide holes 26$^d$ and 26$^e$ respectively therein for this purpose. In the embodiment shown in Figs. 18–21 the ends of the bracelet are transversely flat and are provided with the holes 26$^d$ therein. In the embodiment shown in Figs. 22–24 the ends of the ring members are vertically flattened and are provided with the holes 26$^e$ therein.

While any suitable type of clasp means adapted to extend transversely around said ring members to cooperate with said clasp attaching means thereon to hold said ring members 22 in side by side relationship and against rotative movement thereon, I preferably employ an upper and lower clasp means for this purpose. In the embodiment shown in Figs. 1–8 the lower clasp means 32 is constructed from the blank 32 having the aligned slits 34 therein and provided with the side walls 35 adapted to be bent upwardly as shown in Fig. 3 to provide the side walls 35 having the prongs 36 therein in said lower clasp member 32. In the embodiment shown in Figs. 9–11 the lower clasp member is provided with the side walls 35 not having the prongs therein. In the embodiment shown in Figs. 12–14 however, the upwardly projecting side walls 35 are provided with the prongs 36 therein. In the embodiment shown in Figs. 18–21 the lower clasp member 32 is provided with the spaced round prongs 36 projecting upwardly therefrom. In the embodiment shown in Figs. 22–24 however, the lower clasp means comprises the transverse rods 32 later to be described.

As stated hitherto, the clasp means preferably consists of the upper clasp member 38 in addition to the lower clasp member 32. In the embodiment shown in Figs. 1–8 the upper clasp member is constructed from the blank shown in Fig. 2 formed with the indentations 41 adapted to form end portions 40 and form base portions 42 provided with the lateral portions 44 adapted to be bent downwardly to form side walls for the base portions 42 and top portions 37 provided with lateral portions 39 adapted to be bent down to form the side walls 39. In practice after the ends of the ring members have been strung on the lower clasp portion 32, one base portion 42 of the upper clasp member 38 with the side walls 44 projecting upwardly therefrom is inserted underneath one end of the lower clasp member 32, the side walls 39 and 44 of the upper and base portions 37 and 42 respectively having been inturned. The strip 38 is then bent upwardly to form the end wall 40 around one end of the assembly shown in Fig. 3, the top portion 37 is then bent downwardly to firmly clasp the upper clasp member downwardly against the upper edges of the ring members, the side walls 39 projecting downwardly for this purpose, and the opposite end wall 40 thereof is then bent downwardly as shown in Fig. 5 and the opposite base portion 42 bent upwardly to the position shown in Fig. 6 with the side walls 44 of the base portions, thereby abutting the lower surface of the ends of the ring members and the side walls 39 of the upper portion 38 abutting the top surfaces of the ends of the ring members, said top and bottom portions 37 and 42 being secured together practically around the assembly shown in Fig. 6 by the end walls 40. In similar fashion is the upper clasp member 38 bent around the lower clasp member and attached rings in the embodiment shown in Figs. 9–11. In the embodiment shown in Figs. 12–14 the downwardly projecting side walls 39 of the upper clasp member are provided with the cooperating holes 46 adapted in clasped position to receive the ends of the ring members 26ª therein. In this embodiment, however, the ends of the ring members are inserted through the holes 46 in the upper clasp member as in the other embodiments, and after this has been done the ends of the prongs 36 are bent inwardly as at 48 as shown in Figs. 12–14 underneath the ends 26ª of the ring members. In the embodiment shown in Figs. 15–17 the side walls 39 of the upper clasp member 38 are provided with the sets of aligned holes 46, the upstanding side walls 34 of the lower clasp member being also provided with the aligned holes 36ª. In the embodiment shown in Figs. 18–21 and 12–15 the base portions 42 of said upper clasp member 38 do not extend completely along the bottom of the lower clasp member 32, but merely extend a short distance around each end thereof to bind said upper and lower clasp members together. In the embodiment shown in Figs. 22–24 the upper clasp member 38 is provided with the top wall 37 having the downwardly projecting side walls 39 having the holes 46 therein and the end walls 40 having the holes 48 therein adapted to receive the ends of the lower clasp means or wires 32 therein.

While any suitable type of clasp means adapted to cooperate with suitable clasp attaching means in the ends of the ring members may be employed I have illustrated in these figures various specific possible types. In the embodiment shown in Figs. 9–11 the lower clasp member 32 is formed with the side walls 35, but without the slits or prongs therein and the downwardly projecting hooks 26ᵇ on the ends of each individual ring member are hooked over the side walls 35 and the upper clasp member 38 attached in similar fashion to the attachment of the upper clasp member in the embodiment shown in Figs. 1–8. In the embodiment shown in Figs. 12–14 holes 46 are formed in the side walls 39 of the upper clasp member 38 and the ring members are provided with similar ends 26ª as in the embodiment shown in Figs. 6–8. These slits are then inserted within the holes 46 and then turned to lock themselves within. In this embodiment as shown in Fig. 12 the prongs 36 of the lower base members are adapted to be inserted within the lower end of the holes 46 underneath the ends 26ª of the individual ring members to lock said ring member ends therein. In the embodiment shown in Figs. 12–14 the ring members are inserted within the holes 46 in the downwardly projecting walls 39 of the upper clasp member 38 and then the prongs 36 of the lower clasp member are inturned underneath the ends of the ring members as at 49. In the embodiment shown in Figs. 17–21 the prongs 36 of the lower clasp member are stuck upwardly through the holes 26ᵈ in the transversely flat ends of the ring members and the upper clasp member 38 secured thereto by bending the end walls 40 downwardly thereof and underneath the ends of the lower clasp member for a short distance only as at 42 similar to the manner done in Figs. 12–14. It is obvious, however, that in any of the embodiments it is merely necessary to extend the base portions 42 a short distance underneath the lower clasp member instead of continuing it substantially half the length shown in the preferred embodiment. In the embodiment shown in Figs. 22–24 the ends of the ring members are vertically flattened and provided with the transverse holes. The ends 26ᵉ are then threaded through the holes 46 in the side walls 39 of the upper clasp member 38 and placed into horizontal alignment when the lower clasp means 32 comprising the wires may be threaded through the transverse holes of said vertically flattened ends 26ᵉ and secured in suitable holes 47 in the end walls 40 of said upper clasp member. It is obvious, however, that any desired variation of construction of the clasp means other than the specific constructions shown may be employed, the ones shown merely being for purposes of illustration.

While any suitable type of ornamentation 52 may be put on the outer surface of the material 50, in my preferred embodiment I have shown a type indented with diamonds which leaves a sheen on the soft material of the strip 50 corresponding to the sparkle of a diamond and it is to the particular construction of multiple ring bracelets constructed with this type of ornamentation that my invention specifically relates. Holes with substantially equivalent sheen can be produced however, by certain types of metal. As I employ no solder in soldering the ends of the rings together to form true rings, but merely provide clasp means for this purpose, it is apparent that it is not necessary to heat the diamond indented surface to cause it to loose its sheen and I am enabled therefore to provide a bracelet formed of multiple rings having diamond indented outer surfaces not disturbed in any manner by heat or solder and which will lie evenly on the wearer in use.

It is understood that my invention is not limited to the specific embodiments shown and methods described and that various deviations may be made therefrom without departing from the spirit and scope of the appended claims.

What I claim is:

1. A bracelet, comprising a plurality of split ring members shaped to form cooperating attaching means near each end thereof and having diamond indented holes on the outer surface thereof and clasp means adapted to extend transversely over said ring members to cooperate with said cooperating attaching means to hold said ring members in side by side relationship and against rotative movement thereon.

2. A bracelet, comprising a plurality of split ring members shaped to form cooperating attaching means near each end thereof and clasp means adapted to extend transversely around said ring members to cooperate with said attaching means to hold said ring members in side by side relationship and against rotative movement thereon.

3. A bracelet, comprising a plurality of split ring members, each having diamond indented holes on the outer surface thereof and sets of transverse notches on the outer edges thereof near each end thereof, a lower clasp member having a base having upstanding side walls having aligned notches therein forming prongs between said notches adapted to register in adjacent notches of adjacent ring members to string the opposite ends of said ring members therein in side by side relationship and an upper clasp member comprising a strip adapted to transversely encompass said lower clasp member to bind said ring members thereto in side by side relationship.

4. A bracelet, comprising a plurality of split ring members, each having sets of transverse notches on the outer edges thereof near each end thereof, a lower clasp member having a base having upstanding side walls having aligned notches therein forming prongs between said notches adapted to register in adjacent notches of adjacent ring members to string the opposite ends of said ring members therein in side by side relationship and an upper clasp member comprising a strip adapted to transversely encompass said lower clasp member to bind said ring members thereto in side by side relationship.

5. A bracelet, comprising a plurality of split ring members, each shaped to form clasp attaching means near each end thereof, a lower clasp member having a base having upstanding side walls and an upper clasp member comprising a strip adapted to transversely encompass said lower clasp member to bind said ring members thereto in side by side relationship.

6. A bracelet, comprising a plurality of split ring members, shaped to form clasp attaching means near each end thereof, a lower clasp member having a base having upstanding side walls, an upper clasp member adapted to cooperate with said lower clasp member to bind said ring members thereto, one of said clasp members having aligned indentations therein to receive adjacent ring members to string the opposite ends of said ring members therein in side by side relationship.

7. A bracelet, comprising a plurality of split ring members, shaped to form clasp attaching means near each end thereof, a lower clasp member having a base having upstanding side walls and an upper clasp member adapted to cooperate with said lower clasp member to bind said ring members thereto, the upper clasp member having aligned indentations therein adapted to cooperate with said adjacent clasp attaching means of adjacent ring members to string the opposite ends of said ring members therein in side by side relationship.

8. A bracelet, comprising a plurality of split ring members, each having holes therein near each end thereof, lower clasp means and upper clasp means adapted to cooperate with said lower clasp means and said attaching means to hold said ring members in side by side relationship and against rotative movement thereon, one of said clasp means having means adapted to extend through said holes.

9. A bracelet, comprising a plurality of split ring members, each having flattened ends having holes therein, lower clasp means and upper clasp means adapted to cooperate with said lower clasp means to hold said ring members in side by side relationship and prong means projecting from one of said means adapted to project through said holes to secure said ring members against rotative movement thereon.

10. A bracelet, comprising a plurality of split ring members, each having transversely flat heads having holes therein, lower clasp means having prongs projecting upwardly therefrom adapted to project through said transverse holes in the ends of said ring members and upper clasp means adapted to cooperate with said lower clasp means to secure the ends of said ring members thereto.

CLIFFORD G. KING.